United States Patent [19]

Strubbe et al.

[11] Patent Number: 5,047,867
[45] Date of Patent: Sep. 10, 1991

[54] INTERFACE FOR A TV-VCR SYSTEM

[75] Inventors: Hugo J. Strubbe, Yorktown Heights, N.Y.; Donald R. Gentner, Palo Alto, Calif.

[73] Assignee: North American Philips Corporation, New York, N.Y.

[21] Appl. No.: 363,569

[22] Filed: Jun. 8, 1989

[51] Int. Cl.$^5$ ............................................... H04N 5/76
[52] U.S. Cl. ...................... 358/335; 358/183; 358/191.1
[58] Field of Search ............... 358/310, 194.1, 183, 358/335, 191.1, 192.1, 193.1, 22, 22 PIP, 22 CK; 369/30, 24; 360/33.1, 79

[56] References Cited

U.S. PATENT DOCUMENTS

| | | | |
|---|---|---|---|
| 4,488,179 | 12/1984 | Krüger et al. | 358/194.1 |
| 4,566,034 | 1/1986 | Harger et al. | 358/194.1 |
| 4,626,847 | 12/1986 | Zato | 358/194.1 |
| 4,649,428 | 3/1987 | Jones et al. | 358/194.1 |
| 4,718,112 | 1/1988 | Shinoda | 358/194.1 |
| 4,899,370 | 2/1990 | Kameo et al. | 358/194.1 |
| 4,914,516 | 4/1990 | Duffield | 358/183 |
| 4,918,518 | 4/1990 | Phillips | 358/183 |
| 4,918,531 | 4/1990 | Johnson | 358/183 |
| 4,949,179 | 8/1990 | Hosono | 358/183 |
| 4,959,720 | 9/1990 | Duffield et al. | 358/194.1 |
| 4,965,557 | 10/1990 | Schepers et al. | 358/194.1 |

Primary Examiner—Roy N. Envall, Jr.
Assistant Examiner—Thai Tran
Attorney, Agent, or Firm—Edward W. Goodman

[57] ABSTRACT

A system for integrating the operation and control of a television receiver and a video cassette recorder (vcr), the television receiver being capable of receiving and displaying various television channels as well as other video signals, and the vcr being capable of recording programs at least from the broadcast channels and reproducing programs previously recorded on tapes and outputting the programs as video signals, the system having a device for enabling a user to control the system and thereby operate the television receiver and/or the vcr, and to enter information concerning the user's favorite broadcast programs and various particular broadcast programs into the system, the information including the program name, broadcast channel, starting time, length, repeat pattern in the case of favorite broadcast programs, and whether the user wants the program recorded; a first store for storing the favorite broadcast program information and the various particular broadcast program informantion; a second store for storing information concerning programs on a tape currently loaded in the vcr; a third store for storing information concerning programs on other tapes of the user; a devicd coupled to the vcr for controlling the recording and reproducing functions thereof in response to the information stored in the first and second stores and the enabling device; an output device coupled to the first, second and third stores for selectively providing to the television receiver an output of the system including the favorite broadcast program information, the program information of the current tape, and the program information of the other tapes; and a device coupled to the television receiver for selectively switching an input of the television receiver between the broadcast channels, the vcr output and the system output.

13 Claims, 18 Drawing Sheets

```
              FAVORITE PROGRAMS
    1   60 MINUTES          7:00 PM   CBS
    2   ABC NEWS            6:30 PM   ABC
    3   AS THE WORLD TU     2:00 PM   CBS
    4   DATING GAME         2:30 PM   CH 9
    5   FRONTLINE           8:00 PM   CH 13
    6   GENERAL HOSPITAL    3:00 PM   ABC
    7   JEOPARDY            7:00 PM   ABC
         MORE SHOW SECOND PAGE
```

FIG. 6a

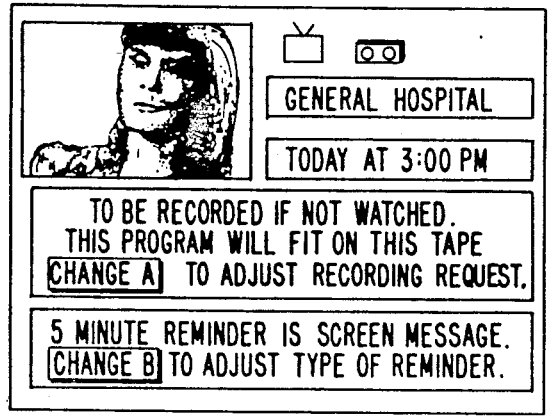

FIG. 6b

```
              FUTURE PROGRAMS
    1   NEWLYWED GAME       2:00 PM
    2   DATING GAME         2:30 PM   RECORD
    3   GENERAL HOSPITAL    3:00 PM
    4   ABC NEWS            6:30 PM   RECORD
    5   NOVA                9:00 PM
```

FIG. 8a

```
              FUTURE PROGRAMS
    1   NEWLYWED GAME       2:00 PM
    2   DATING GAME         2:30 PM   RECORD
    3   GENERAL HOSPITAL    3:00 PM
    4   ABC NEWS            6:30 PM   RECORD
    5   NOVA                9:00 PM
```

FIG. 8c

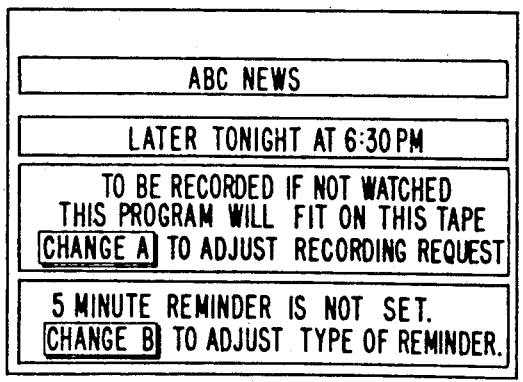

FIG. 8b

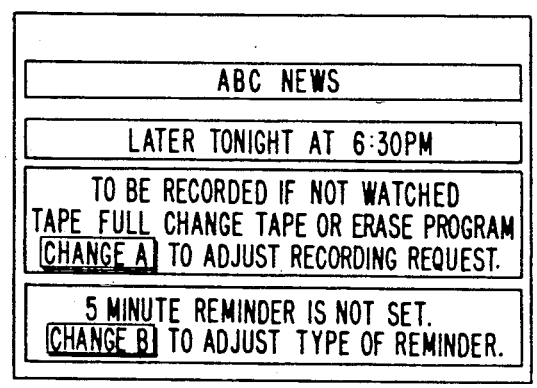

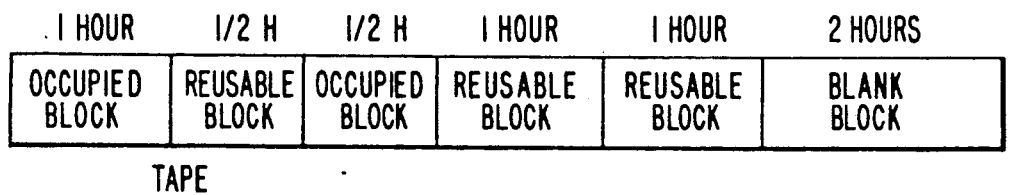

FIG.13c

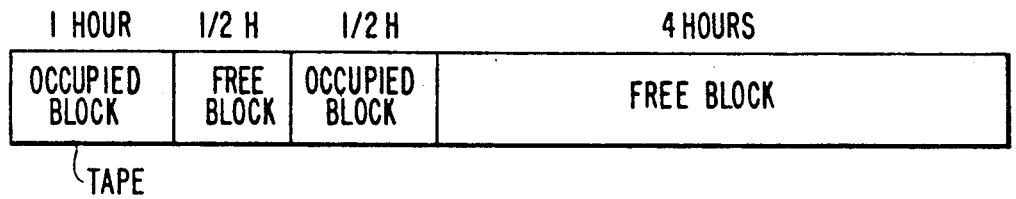

FIG.13f

```
PROGRAM 1 = 1H        BLOCK 1 = 2 HOURS LONG
PROGRAM 2 = 1/2H      BLOCK 2 = 2 H
PROGRAM 3 = 1H        BLOCK 3 = 3 H
PROGRAM 4 = 2H        BLOCK 4 = 1 H
PROGRAM 5 = 2H
```

|  | BLOCK NUMBERS | | | | | | | |
|---|---|---|---|---|---|---|---|---|
| PROGRAM 2 = 1/2H INTO | 2 | 3 | 2 | 2 | 3 | 3 | 2 | 3 |
| PROGRAM 3 = 1H INTO | 2 | 2 | 3 | 2 | 3 | 2 | 3 | 3 |
| PROGRAM 5 = 2H INTO | 2 | 2 | 2 | 3 | 2 | 3 | 3 | 3 |

FAILURE: LENGTH OF BLOCK 2 IS LESS THAN THE LENGTH OF ITS ASSIGNED PROGRAMS

SUCCESS: BLOCK 2 CAN CONTAIN PROGRAM 2 AND PROGRAM 3; WHILE BLOCK 3 CAN CONTAIN PROGRAM 5 NO FUTHER COMBINATIONS NEED TO BE INSPECTED

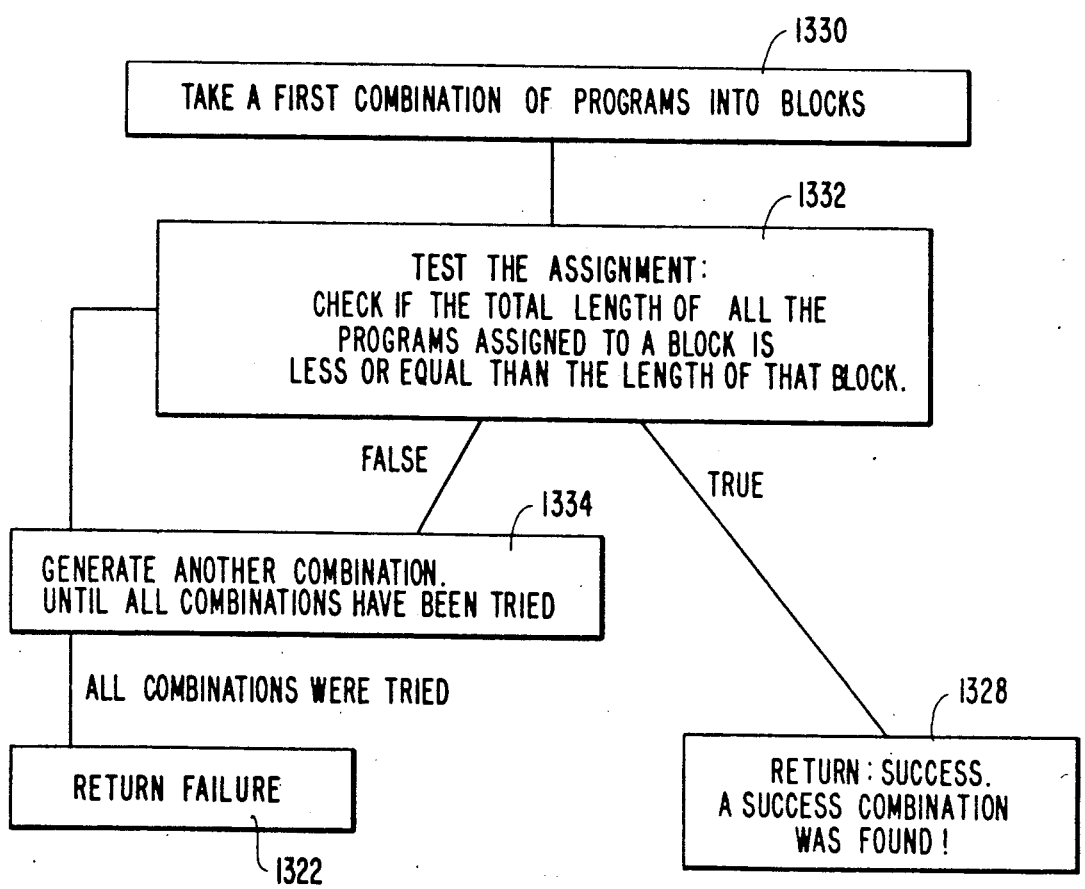

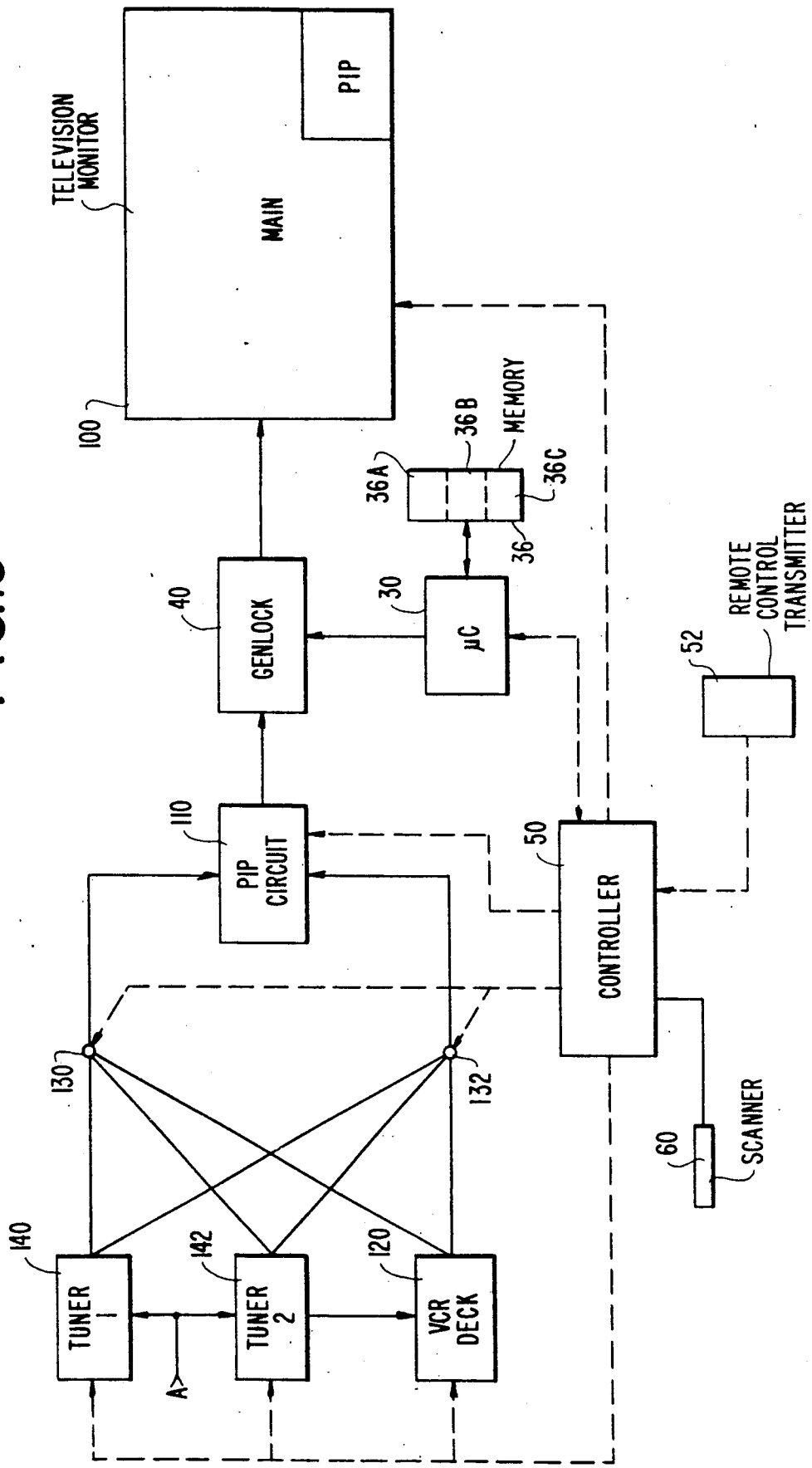

INTERFACE FOR A TV-VCR SYSTEM

BACKGROUND OF THE INVENTION

1. Field of the Invention

The subject invention relates to a system for integrating the operation and control of a television receiver and a video cassette recorder

2. Description of Related Art

With the advent of video cassette recorders (vcr's), a problem that has arisen in consumers is how to use it to take advantage of the many features it presents, for example, the automatic recording of television programs. Surveys have shown that most people who own vcr's do not know how to use these functions properly and consistently miss recording programs that they want. The problem resides in the fact that the procedure for setting up the timing function of the vcr is very complicated and must be repeated each time it is desired to record a program.

SUMMARY OF THE INVENTION

An object of the present invention is to provide a system for integrating the operation and control of a television and a vcr such that use thereof is simplified.

Another object of the present invention is to provide a system which readily communicates to the user the programs contained on a tape cartridge inserted in the vcr and lets the user mark certain ones of these programs for deletion while eliminating the need for the user to know the program layout on the particular tape.

Another object of the invention is to provide a system in which the user needs to identify his/her favorite programs only once.

A further object of the present invention is to provide a system in which the user is informed which and when each of his/her favorite programs is going to be broadcast in the near future and optionally is given an automatic reminder, wherein the system further activates the vcr for recording the program, if desired, and informs the user about the available space on the tape in use.

These objects are achieved in a system for integrating the operation and control of a television receiver and a video cassette recorder (vcr), said television receiver being capable of receiving and displaying various television channels as well as other video signals, and said vcr being capable of recording programs at least from said broadcast channels and reproducing programs previously recorded on tapes and outputting said programs as video signals, said system comprising means for enabling a user to control said system and thereby operate said television receiver and/or said vcr, and to enter information concerning said user's favorite broadcast programs and various particular broadcast programs into said system, said information including the program name, broadcast channel, starting time, length, repeat pattern in the case of favorite broadcast programs, and whether the user wants the program recorded; first storing means for storing said favorite broadcast program information and said various particular broadcast program information; second storing means for storing information concerning programs on a tape currently loaded in said vcr; third storing means for storing information concerning programs on other tapes of said user; means coupled to said vcr for controlling the recording and reproducing functions thereof in response to said information stored in said first and second storing means and said enabling means; output means coupled to said first, second and third storing means for selectively providing to said television receiver an output of said system including said favorite broadcast program information, the program information of said current tape, and the program information of said other tapes; and means coupled to said television receiver for selectively switching an input of said television receiver between said broadcast channels, said vcr output and said system output.

BRIEF DESCRIPTION OF THE DRAWINGS

With the above and additional objects and advantages in mind as will hereinafter appear, the invention will be described with reference to the accompanying drawings, in which:

FIGS. 6a and 6b show typical pages for the favorite broadcast program menu and an individual favorite broadcast program;

FIGS. 8a-8d show the menu page for future programs and the particular program page in which there is and is not enough room on the tape to record the indicated program;

FIGS. 11a and 11b show the graphics overlaid on a program being presently recorded, while

FIGS. 13a-13f show flow charts in which the system automatically positions the tape at the beginning of a blank area thereon;

FIG. 15 is a block diagram of an alternate embodiment of the system in which a single genlock circuit is used.

DESCRIPTION OF THE PREFERRED EMBODIMENT

Figure 1:
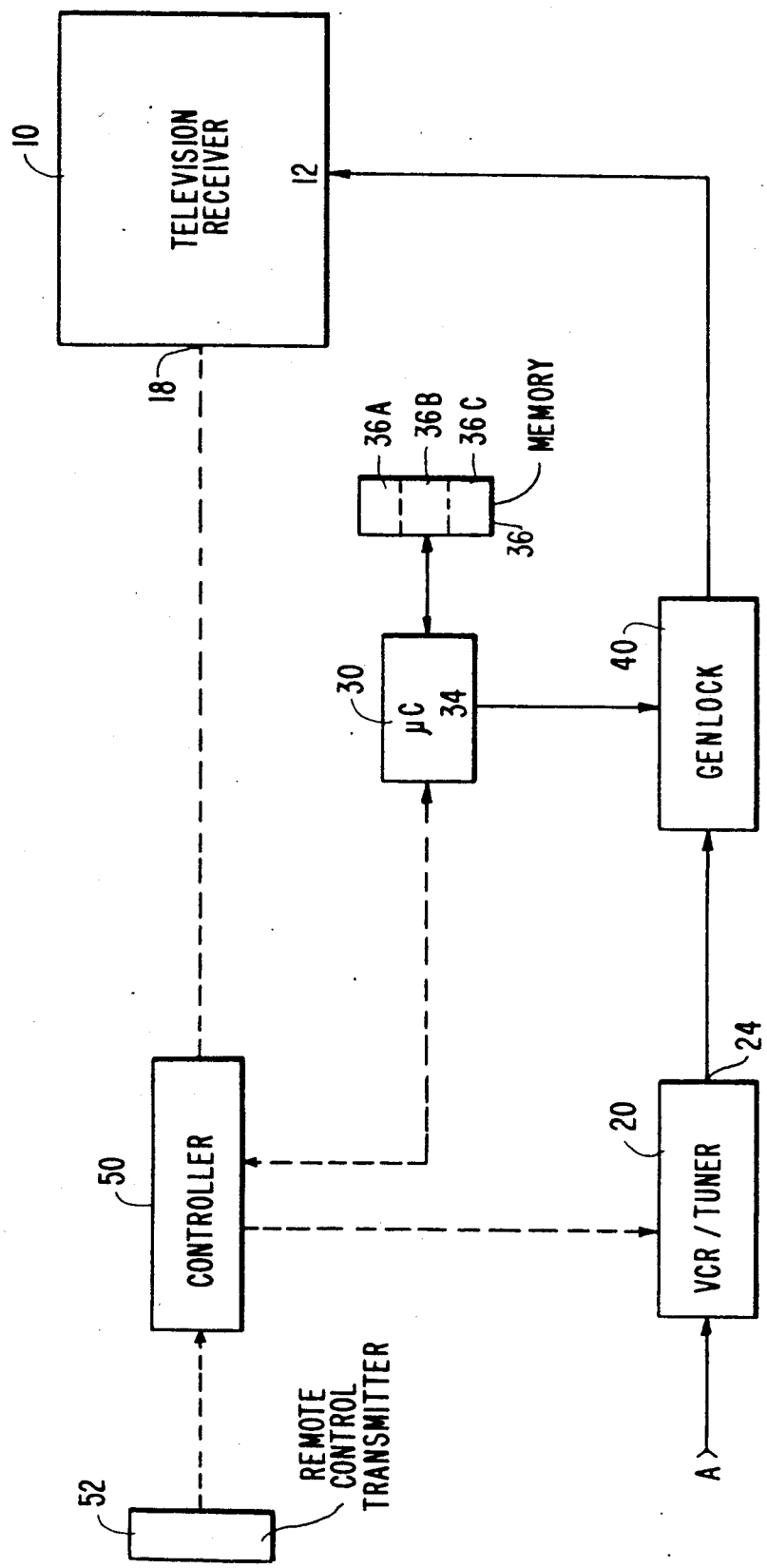
FIG. 1 is block diagram of the system of the subject invention connected for use with a television receiver and a video cassette recorder with a built-in tuner.

The system shown in FIG. 1 includes a television receiver 10 and a vcr/tuner 20, each having its own built-in tuner. The television receiver 10 includes a video port 12 for receiving video signal. The television receiver 10 further includes a control input 18 for receiving signals for remotely controlling the functions thereof.

The vcr/tuner 20 has an input 22 for receiving video signals from video source A (an antenna or cable) and an output 24 for supplying video signals to the video port 12 of the television receiver 10.

A microcomputer 30 has an output port 34 coupled to a genlock circuit 40 arranged in the signal line to the video port 12 for inserting graphics into the picture signals therein. The microcomputer 30 has associated therewith a memory 36 having three user-accessible memory parts 36A-36C for storing various program related information.

Each of the above components receives control signals from a controller 50 which is, in turn, controlled by a remote control transmitter 52.

Figure 2:
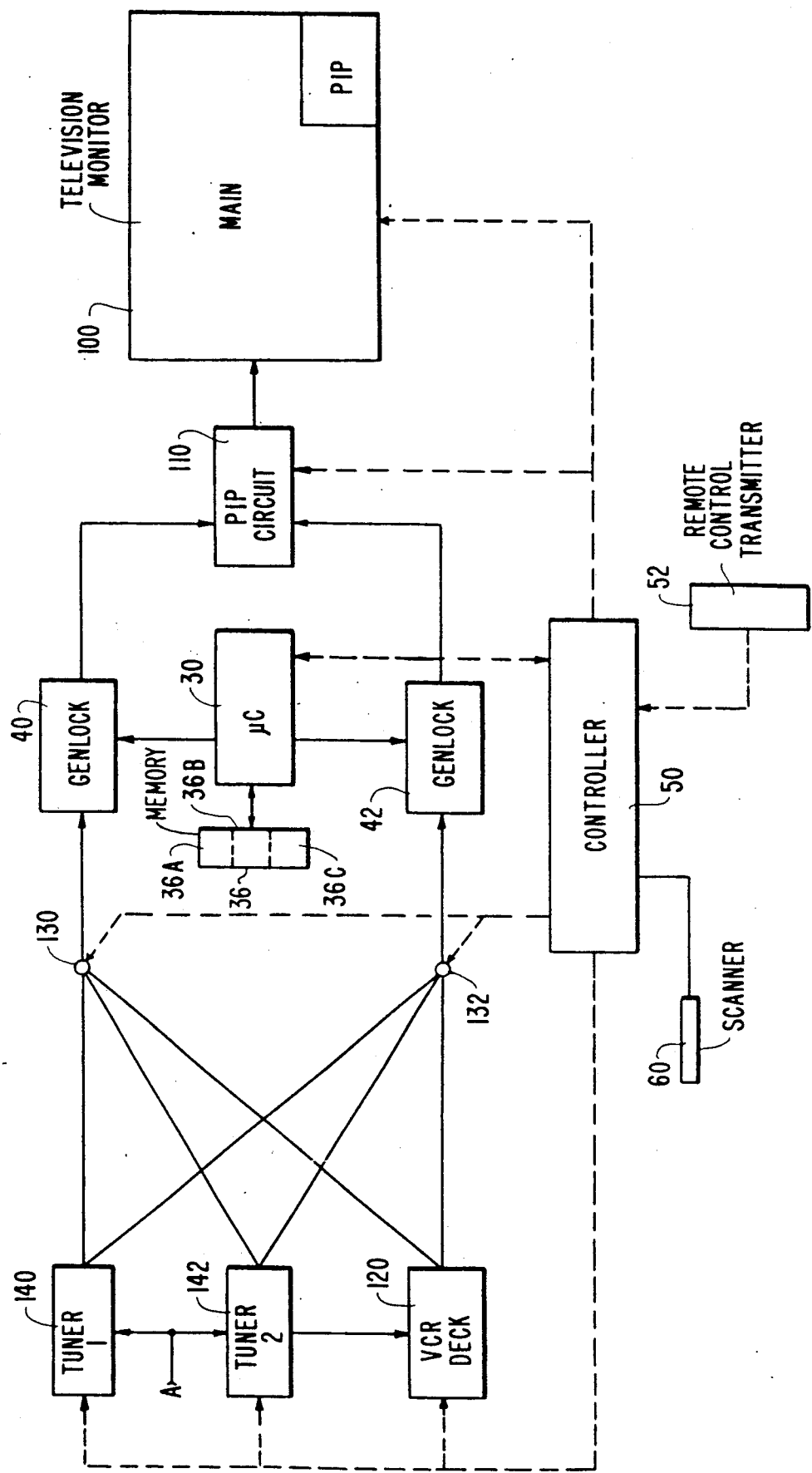
FIG. 2 is a block diagram of the system of the subject invention connected to a video monitor, a video cassette recorder, and two tuners, all arranged as a single integrated unit.

While FIG. 1 shows the invention used with a separate television receiver and a separate vcr/tuner, the preferred embodiment of the system is shown in FIG. 2 in which the components therein are combined into a single integrated unit. In particular, the system includes the microcomputer 30, the controller 50 and the genlock circuit 40 along with a second genlock circuit 42. However, instead of the television receiver 10 and the vcr/tuner 20, the system of FIG. 2 includes a television monitor 100, a vcr recording/playback deck 120 and a pair of television tuners 140 and 142. The television tuners 140 and 142 have inputs coupled to receive broadcast program video signals from video source A. The outputs of the tuners 140, 142 and the vcr deck 120 are connected by a first controllable video switch 130 to an input of the genlock circuit 40, and by a second controllable video switch 132 to an input of the genlock circuit 42. The system further includes a picture-in-picture (PIP) circuit 110 to which the outputs of the genlock circuits 40 and 42 are applied, and which applies a video output signal to the television monitor 100. The PIP circuit 110 selectively displays the video signals from the genlock circuit 40 or 42 as a PIP display overlying a portion of the main display on the television monitor 100. The microcomputer 30, television monitor 100, the PIP circuit 110, the vcr deck 120, the video switches 130 and 132, and the tuners 140 and 142, each have a control input for receiving control signals from the controller 50.

Figure 3:
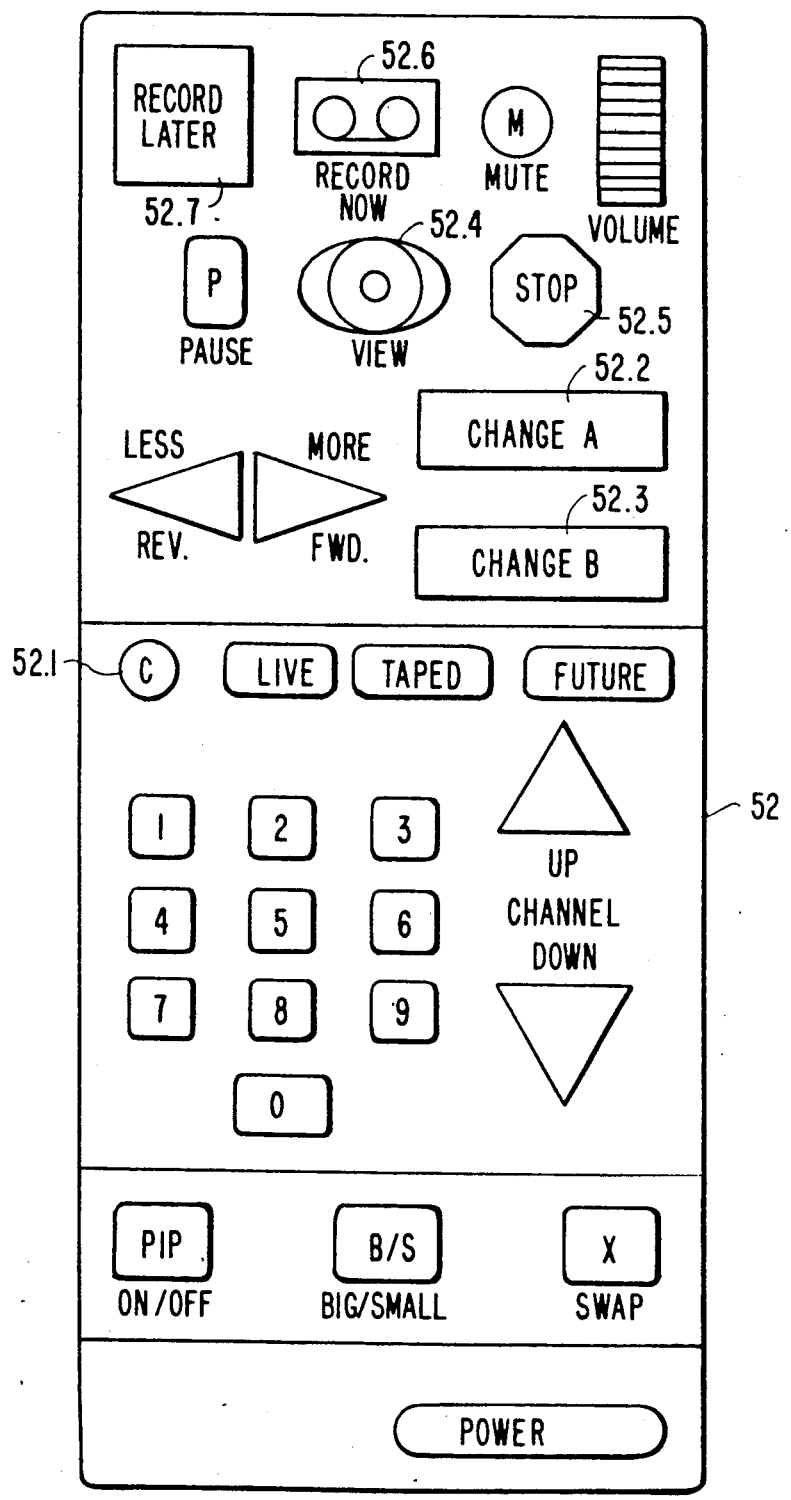
FIG. 3 is a front elevational view of a remote control transmitter for operating the system.

It is the intent of the subject invention to eliminate the need for the user to deal with each of the individual devices. Rather, with the subject invention, the user need only interact with one device, i.e., the controller 50, which, in turn, controls the various tuners 140 and 142, switches 130 and 132, and the vcr deck 120, and, in addition, provides relevant feedback to the user. To this end, the remote control transmitter 52 (shown in FIG. 3), while including most of the standard control buttons found on those devices designed to operate both a television receiver as well as a vcr/tuner, includes several special purpose buttons for enabling a user to more easily use the system.

Figure 4:
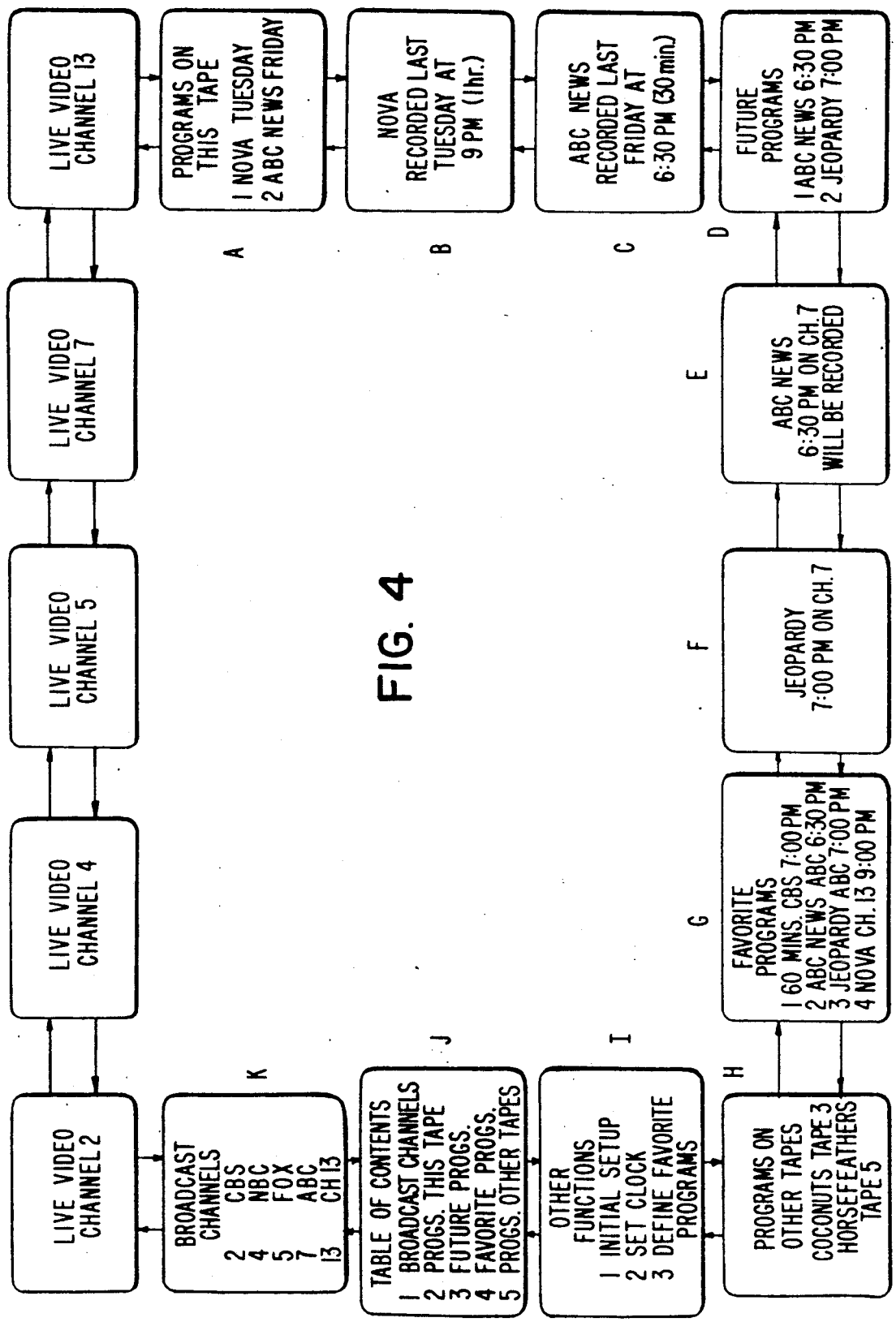
FIG. 4 is a diagrammatic representation of an extended channel ring obtained with the subject invention.

The way in which the user obtains the advantages of the subject system is through scanning the channels in the "channel ring". Typically, by pressing the "channel up" (or "channel down") button on a remote control device, the television receiver is caused to sequentially tune to each of the channels in its channel list in an ascending (or descending) order. Once the end (or beginning) of the list is reached, the television receiver automatically goes to the beginning (or end) of the channel list and proceeds to again scan through the channel list until the "channel up" (or "channel down") button is released. This progression of the possible channels is known as the "channel ring". The subject invention enhances this "channel ring" through the insertion of additional or extended channels. As shown in FIG. 4, these extended channels are in the form of menu pages and program description pages generated by the microcomputer 30 as controlled by the controller 50. In particular, extended channel A shows a Programs on This Tape menu page of the programs on a tape currently loaded in the vcr deck 120. Information concerning the contents of each tape in the user's library of tapes is stored in the memory part 36C of the microcomputer 30 and the information concerning the contents of the particular tape inserted in the vcr deck 120, as identified by a unique code, for example, a bar code read by a scanner 60 coupled to the controller 50, is then transferred from the memory part 36C to the memory part 36B. Extended channels B and C each shows a program description page for each of the programs listed in extended channel A. Extended channel D shows a Future Programs menu page of upcoming programs (for example 7) chronologically occurring in the near future. This information is obtained from the memory part 36A of the microcomputer 30 which stores information concerning the user's favorite broadcast programs and information concerning particular broadcast programs which the user has defined as being desirable to watch or to record. Extended channels E and F show program description pages for the programs listed in extended channel D. Extended channel G shows a Favorite Broadcast Programs menu page of a listing of the favorite programs while extended channel H shows a menu page of the programs on other tapes in the user's library of tapes. Extended channel I shows an Other Functions menu page for accessing other functions of the system, for example, the initial set-up of the system, setting of the system clock, etc. Extended channel J shows a Table of Contents menu page by which the above-noted extended channel menu pages may be directly accessed. The Table of Contents menu page may also be directly accessed by pressing the Contents button 52.1 on the remote control transmitter 52. Finally, extended channel K show a menu page listing the available broadcast channels. The "channel ring" then loops around to the first of the broadcast channels. It should be noted that while each of the extended channels is shown as a single menu page, they may, in fact, consist of several pages in order to show the full contents thereof.

Figure 5:
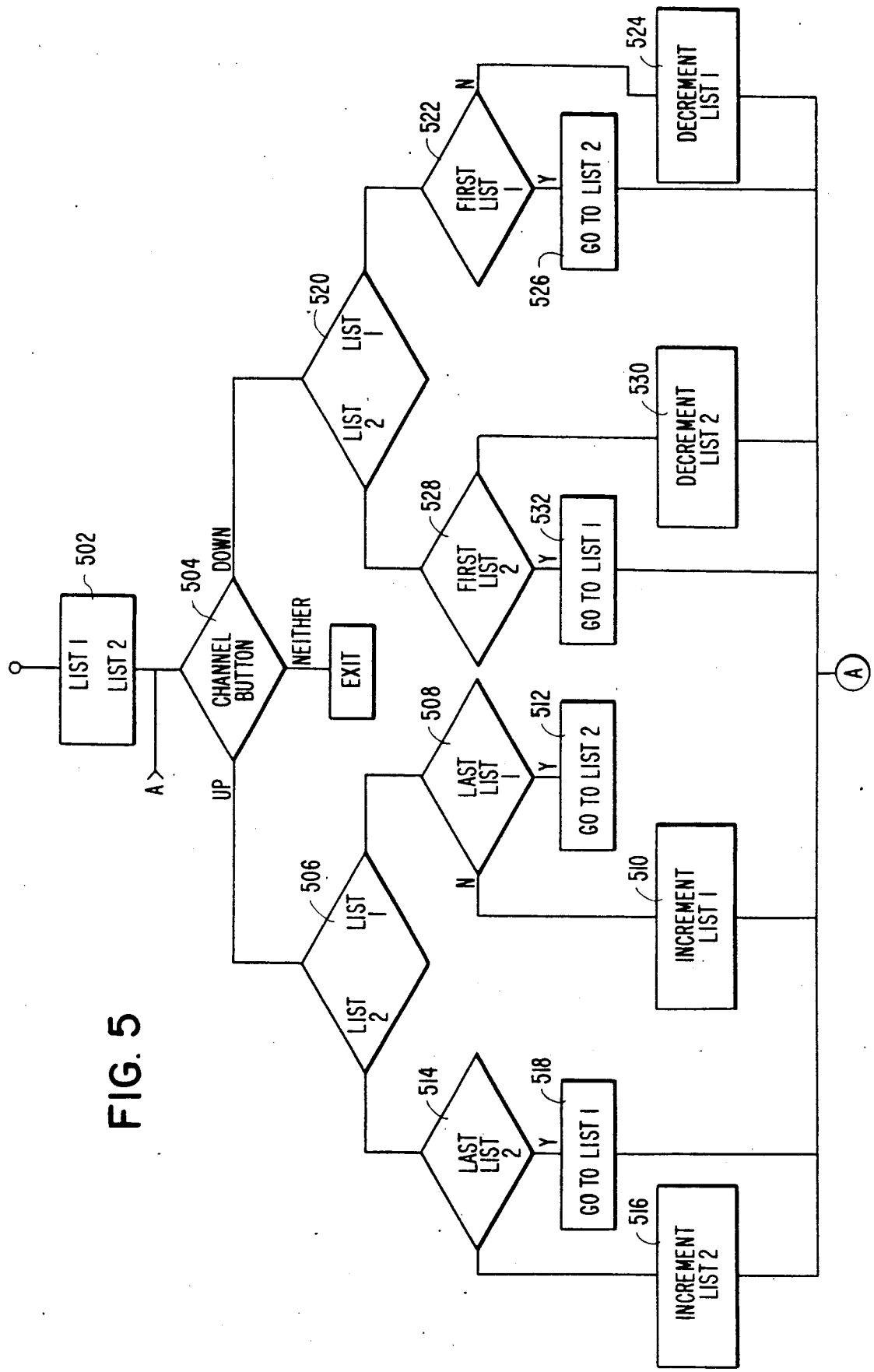
FIG. 5 shows a flow chart for effecting the extended channel ring of FIG. 4.

FIG. 5 shows a flow chart indicating how the system effects the extended channel ring. At block 502, the microcomputer 30 generates a list, List 1, of all the available broadcast programs, and a list, List 2, of all the extended channels. At decision block 504, the microcomputer 30 determines whether the user has pressed the Channel Up or Channel Down button. If the Channel Up button has been pressed, at decision block 506, the microcomputer 30 determines whether the current channel being displayed is a live channel or an extended channel. In the case of a live channel, the microcomputer 30 determines at decision block 508 whether this channel is at the end of List 1. If not, at block 510, the microcomputer 30 increments List 1, causing the next broadcast channel to be displayed, and then loops back to decision block 504. In the event that the current channel is at the last on List 1, the microcomputer 30, at block 512, switches to List 2 and the first of the extended channels is displayed. The microcomputer 30 then loops back to decision block 504. Going back to decision block 506, if the current channel is an extended channel, at decision block 514, the microcomputer 30 determines whether the current channel is at the end of List 2. If not, the microcomputer 30 at block 516 increments List 2 causing the next extended channel to be displayed and then loops back to decision block 504. If the current channel is the last extended channel, the microcomputer 30, at block 518, switches to List 1 causing the first of the broadcast channels to be displayed and loops back to decision block 504. A similar process (blocks 520—532) as discussed above occurs if it is determined that at decision block 504, the Channel Down button has been pressed, with the exception that at blocks 522 and 528, the microcomputer 30 looks for the first channel in the relevant list, at blocks 526 and 532, the microcomputer 30 goes to the end of the relevant list, and at blocks 524 and 530, the microcomputer 30 decrements the relevant list.

With regard to extended channel J, menu selection 4 allows the user to access extended channel G, the Favorite Broadcast Programs menu page as shown in FIG. 6a. This menu page may actually be several pages and includes, for example, the names of each of the favorite broadcast programs, their start times and the network or channel on which they appear. By accessing each of the programs, for example no. 6, the program description page detailing that particular program is shown (see FIG. 6b). The information for each of the programs may be entered by a keyboard (not shown) or, since many television listing digests include bar codes for each of the programs, by using the scanner 60. As an added means for identifying the particular program, the program description page may include a "frozen" PIP representation of a scene from the particular program which is encoded and stored with the other information describing the program. Naturally, this may only be done during an actual broadcast of the particular program using known PIP circuitry. The center of the program description page for each of the programs includes the desired recording option—"to be recorded", "not scheduled for recording" and "to be recorded if not watched"—which are toggled by repetitively pressing the Change A button 52.2 on the remote control transmitter 52. The recording option "to be recorded if not watched", requires that the microcomputer 30 interrogates, at the start of the program, whether the system is in operation and what program material is being applied to the television monitor 100 as the main video signal. If the system is off (that is, in stand-by mode) or the particular program is not being applied as the main video signal, then, at the appropriate time, the microcomputer 30 causes the controller 50 to tune the tuner 142 to the proper channel and to signal the vcr deck 120 to start recording.

Figure 7:
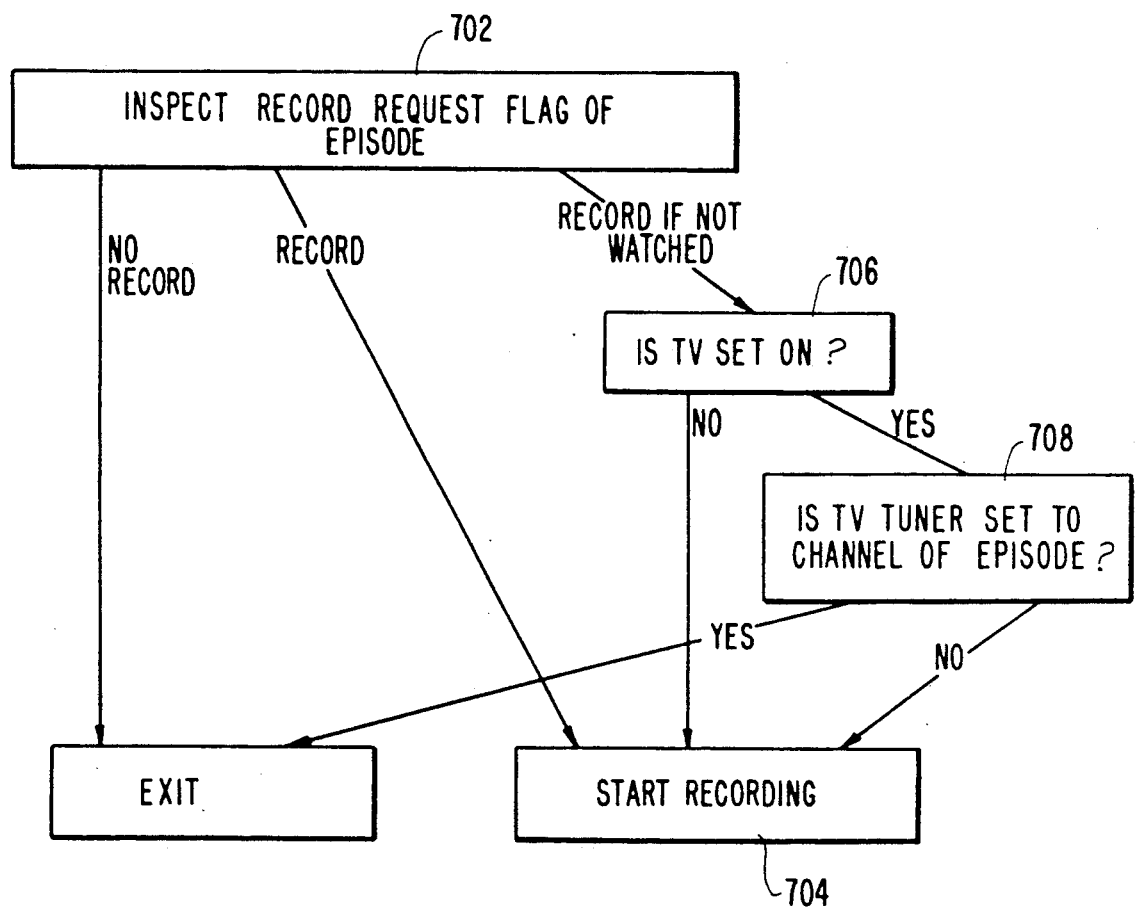
FIG. 7 shows a flow chart for effecting the recording options of the system.

With regard to the recording options, FIG. 7 shows a flow chart depicting this process. In particular, at the appropriate time, at block 702, the microcomputer 30 inspects the recording option flag. If there is no desire to record the program, the routine is exited. If it is desired to record the program, the microcomputer 30 proceeds to block 704 and instructs the controller 50 to cause the vcr deck 120 to initiate recording. If the recording option "to be recorded if not watched" is selected, at decision block 706, the microcomputer 30 checks whether the television monitor 100 is operating. If not, the microcomputer 30 proceeds directly to block 704. If the television monitor 100 is operating, the microcomputer 30, at block 708, checks the appropriate tuner 140 or 142 to ascertain whether the television monitor 100 is displaying the channel on which the relevant program is to be broadcast. If so, the microcomputer 30 exits the routine. If not, the microcomputer 30 goes to block 704.

The bottom of the program description page for each program includes scheduling options—"In Season" or "Out Of Season"—which are toggled by repetitively pressing the Change B button 52.3 on the remote control transmitter 52. In particular, while a program may appear as scheduled during the television season, during the off-season, the program may be put into "hiatus" and not appear again until the next season. To alleviate the need for cancelling this favorite program and then reentering the information, by selecting the "Out Of Season" option, the user causes the system to suspend the inclusion of this program on the Future Program menu page and the subsequent automatic tuning and/or recording of the same, while the system retains the program information in the favorite program listing. At some later time, this option may be changed back to "In Season" such that it is again scheduled to be watched and/or recorded at the appointed time.

As shown in FIG. 8a, the Future Program extended channel shows a menu page of the next, for example, 7 favorite and particular broadcast programs which are chronologically scheduled to be broadcast from the present time. As time progresses past the starting time of each of the programs, the menu page is updated to always include the next 7 programs. With regard to no. 4, it is noted that ABC News is scheduled to be recorded. The detailed menu page for this program (FIG. 8b) shows that this program is to be recorded if not watched and that there is sufficient room on the tape to accommodate the program. If there is insufficient room on the tape, an appropriate message will appear on the detailed menu page (FIG. 8c) and recording indication on the Future Program extended channel will be highlighted (FIG. 8d). It should be noted that the Change A button 52.2 toggles the recording request while the Change B button 52.3 toggles between whether a reminder is desired and which kind of audible/visual reminder is to be given, for example, five minutes before the starting time of the program. This reminder may be an audible signal, or a visual message (typically shown as a PIP display). At the appointed time, the PIP may then show the opening, for example, 10 seconds of the program.

Figure 9A:
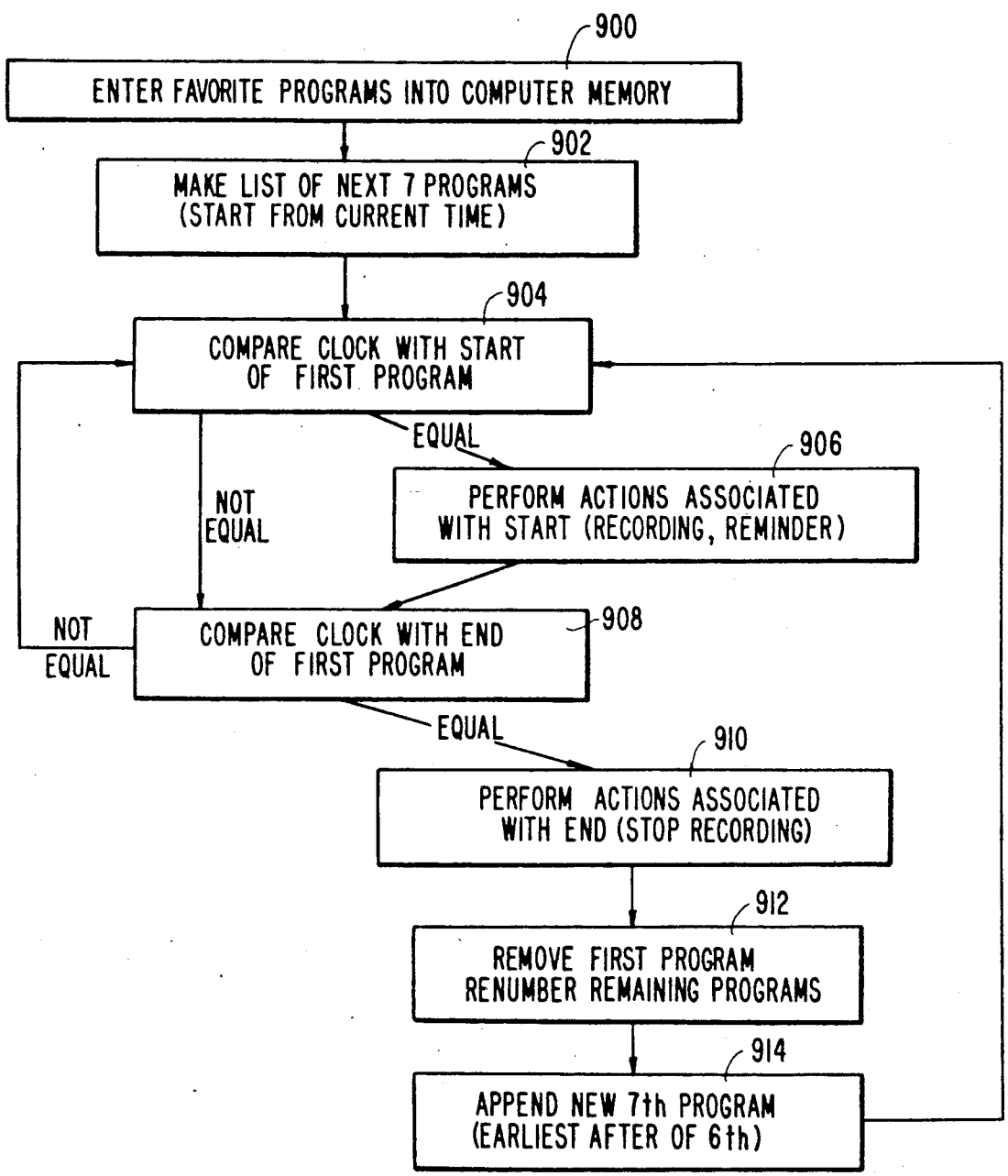
FIGS. 9a-9e show flow charts for effecting the Future Programs.

FIGS. 9a shows a flow chart for operation of the system and particularly, the routine for generating the Future Program extended channel listing and the relevant program description pages, while FIGS. 9b-9e show details of portions of the flow chart of FIG. 9a. In FIG. 9a, at block 900, the microcomputer 30 loads the favorite broadcast programs and the particular broadcast programs from the memory part 36A. At block 902, microcomputer 30 makes a list of the next seven occurring programs. At decision block 904, the microcomputer 30 compares the current time with the starting time of the first program on the list. If they are equal, at block 906, the microcomputer 30 performs the appropriate functions associated with the start of the first program and then proceeds to decision block 908. If at decision block 904, the times are not equal, the microcomputer 30 goes directly to decision block 908. At decision block 908, the microcomputer 30 compares the current time with the scheduled ending time of the first program. If they are not equal, the microcomputer 30 branches back to decision block 904. If they are equal, the microcomputer 30 performs the appropriate functions associated with the end of the first program at block 910. Then, at 912, the microcomputer 30 removes the processed first program from the list and renumbers the remaining six programs. At block 914, the microcomputer 30 determines the next seventh program and appends this program to the end of the list. The microcomputer 30 branches back to decision block 904.

Figure 9B:
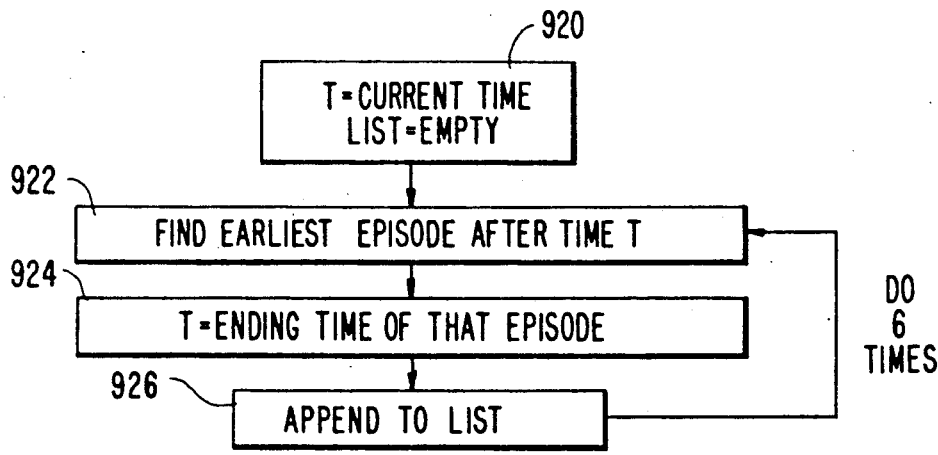

FIG. 9b shows the subroutine for making the list of block 902. In particular, the microcomputer 30 first sets the time t to the current time and the list to empty at block 920. At block 922, the microcomputer 30 examines the programs in the list and determines the earliest program after time t. At block 924, the microcomputer 30 sets the time t at the ending time of this program. Finally, at block 926, the microcomputer 30 adds this program to the list and proceeds to the block 922. After seven programs have been listed, the microcomputer 30 exits the subroutine.

Figure 9C:
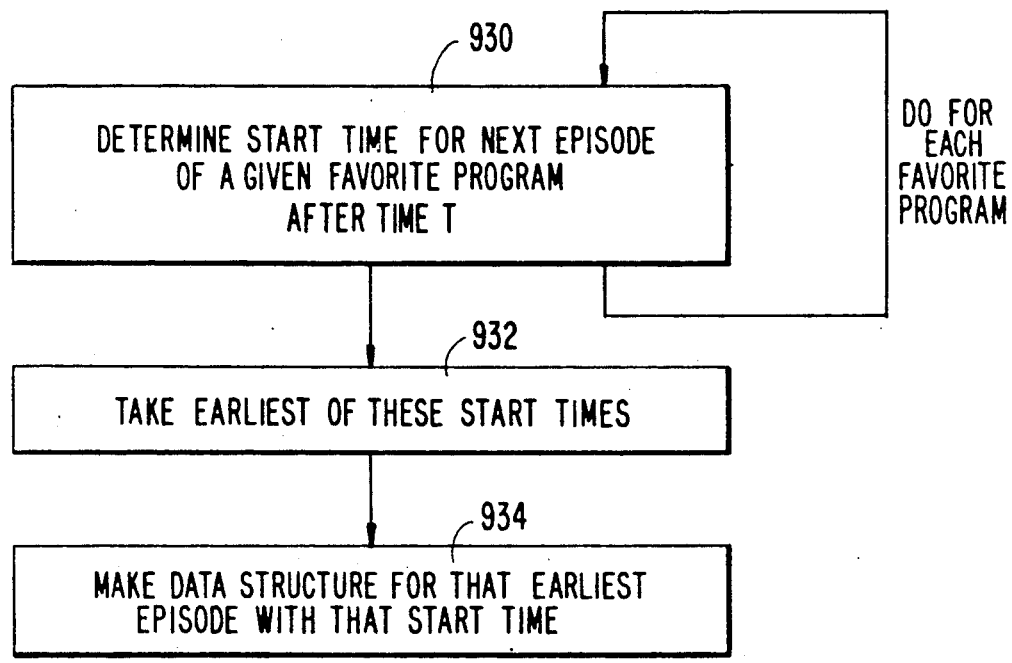

With regard to the favorite broadcast programs, FIG. 9c shows the subroutine for determining the earliest program after the current time for block 922. In this regard, at block 930, the microcomputer 30 determines the start time for the next episode for each of the favorite broadcast programs after the current time. At block 932, the microcomputer 30 takes the episodes with earliest start-time. Finally, at block 934, the microcomputer 30 makes a date structure for the earliest episode with that start time. This subroutine is then exited.

Figure 9E:
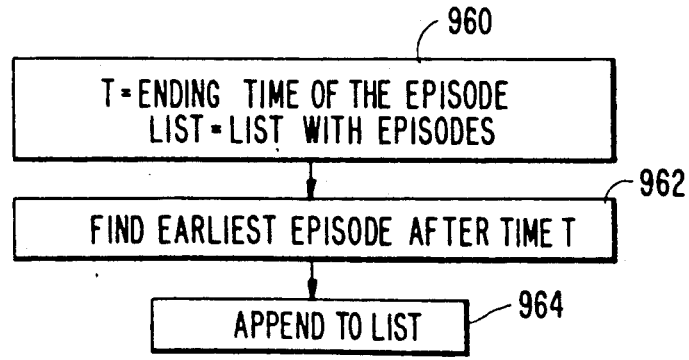
Figure 9D:
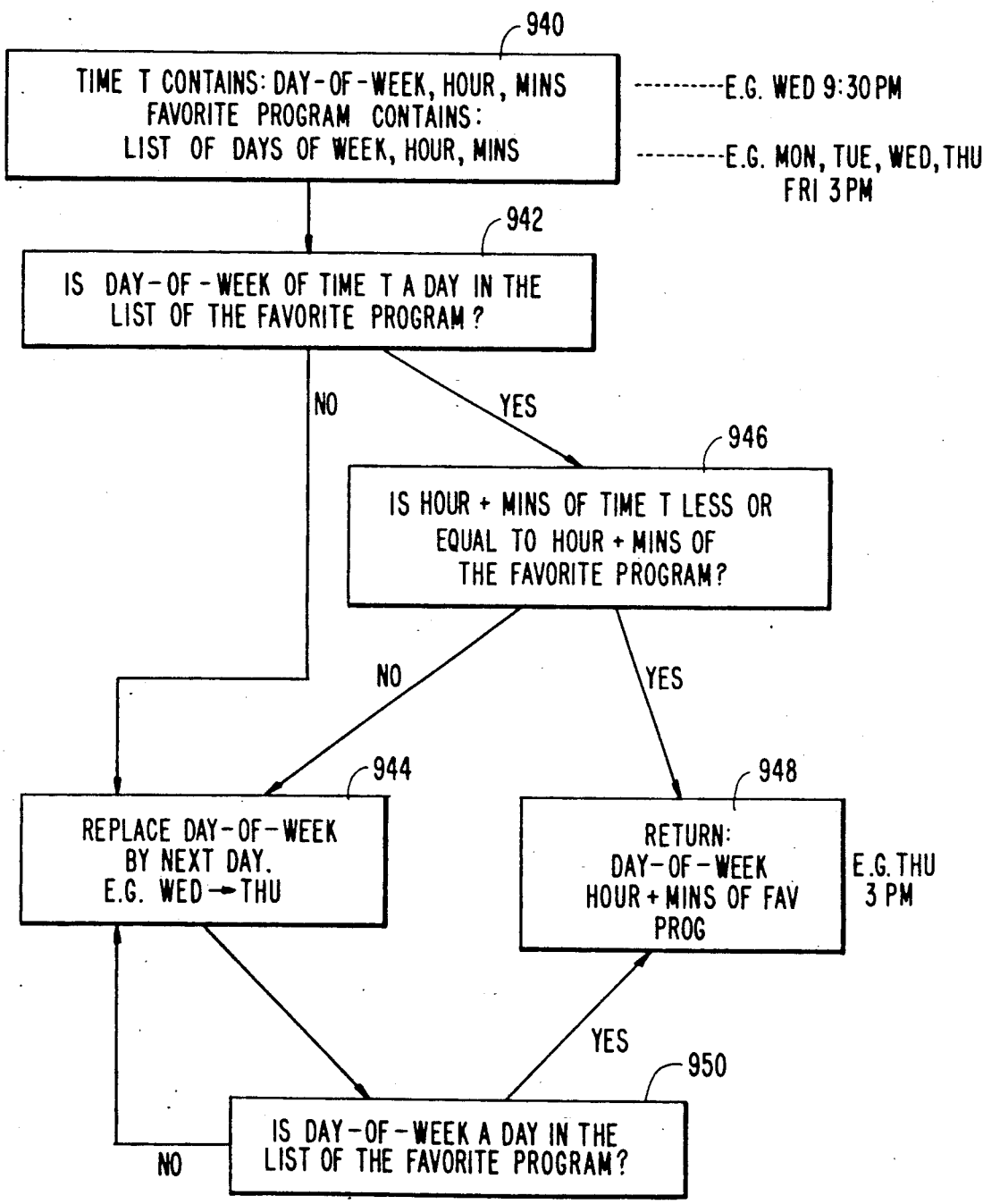

In order to determine the start time for the next episode of a given favorite broadcast program, at block 940 in FIG. 9d, the microcomputer 30 sets up the current time as containing the day of the week as well as the hour and the minute, the information on each favorite program containing the days of the week and the hour and minute of its broadcast. At decision block 942, the microcomputer 30 determines whether the current time day of the week coincides with a day for the relevant favorite broadcast program. If not, at block 944, the microcomputer 30 increments the current time day of the week. If so, at decision block 946, the microcomputer 30 determines whether the current time in hours and minutes is less than or equal to that of the relevant favorite broadcast program. If not, the microcomputer 30 goes to block 944. If so, the microcomputer 30 goes to block 948 and returns the day of week, hour and minute of the relevant favorite broadcast program. After block 944, the microcomputer 30 determines in decision block 950 whether the current day of week coincides with a day for the relevant broadcast program. If so, the microcomputer 30 proceeds to block 948. If not, the microcomputer 30 goes back to block 944.

Finally, with respect to block 914 of FIG. 9a, FIG. 9e shows a subroutine for replenishing the list. In particular, at block 960, the microcomputer 30 sets the time t as the ending time of the sixth program, the list containing programs 1-6. At block 962, the microcomputer 30 determines the earliest episode after time t using the subroutine of FIG. 9c. Finally, at block 964, the microcomputer 30 appends this found program to the list.

Figure 10A:
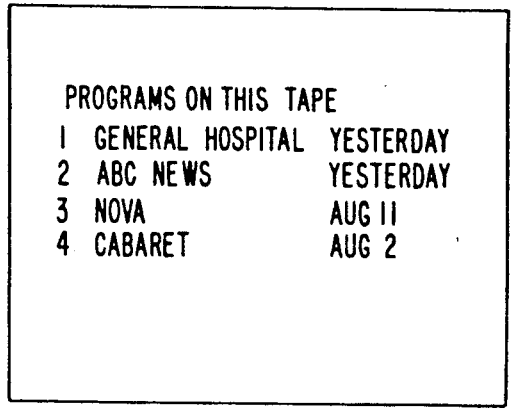
FIGS. 10a-10d show the menu page for the current tape, an individual program page on the current tape, and the menu page for other tapes.
Figure 10B:
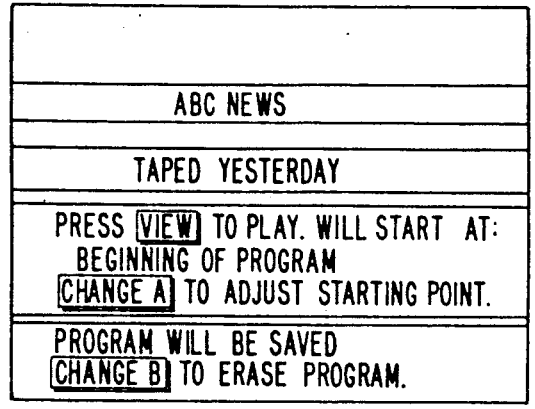
Figure 10C:
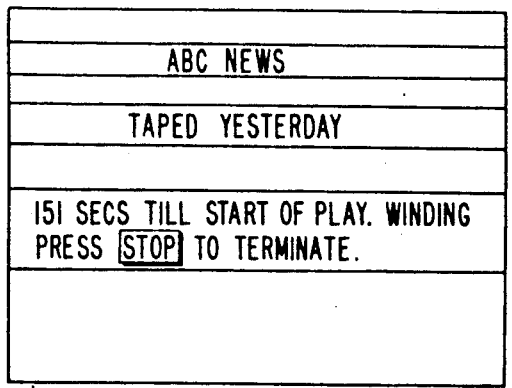

FIG. 10a shows the extended channel for Programs on This Tape while FIG. 10b shows the program description page for program no. 2. In order to watch this program, the user presses the View button 52.4 on the remote control transmitter 52 at which time the program description page shown in FIG. 10c is displayed indicating the amount of time until the start of the program. By depressing the Stop button 52.5, the viewing option is terminated returning the user to the program description page of FIG. 10b. While ordinarily it is desired to watch a program from the beginning, depressing the Change A button 52.2 toggles between other watching options—the beginning, 5 minutes after the beginning, 5 minutes before a previous break in viewing, the break, 5 minutes after the break, and 5 minutes before the end. The Change B button 52.3 selects whether the program is to be saved or erased (at some future time to accommodate another recording request).

Figure 10D:
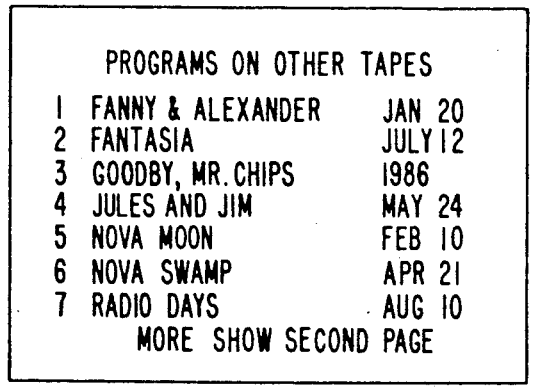

The Tape Archive extended channel shown in FIG. 10d is a menu page listing the programs on other tapes in the user's tape library. This program listing is taken from that stored in memory part 36C.

Figure 11A:
Figure 11B:
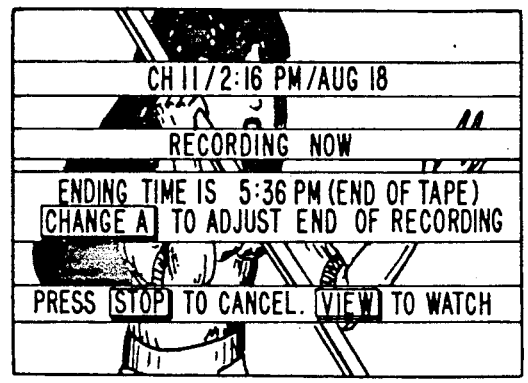
Figure 11C:
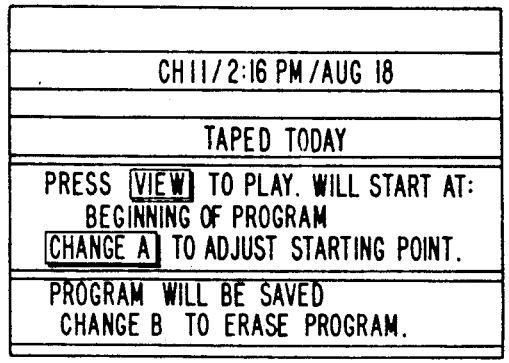
FIG. 11c shows the program page after the program has been recorded.

In order to record a program presently being broadcast, the user depresses the Record Now button 52.6 on the remote control transmitter 52 and the graphic "Recording" appears for approximately 10 seconds overlaid on the television screen with the program being recorded as shown in FIG. 11a. Once recording has commenced, a description thereof appears on the extended channel for Programs on This Tape (see FIG. 11b). It should be noted the system automatically sets the termination time of the recording at the maximum available time on the tape. However, the user may modify this ending time by depressing the Change A button 52.2. The recording is terminated by pressing the Stop button 52.5. Once recording is completed, program description page therefor is as shown in FIG. 11c.

Figure 12A:
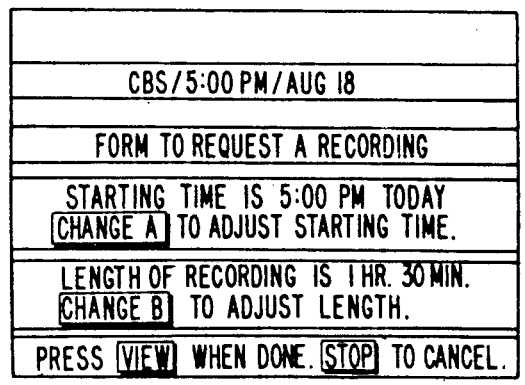
FIGS. 12a and 12b show the program page during the process of setting up a particular broadcast program to be recorded in the future.
Figure 12B:
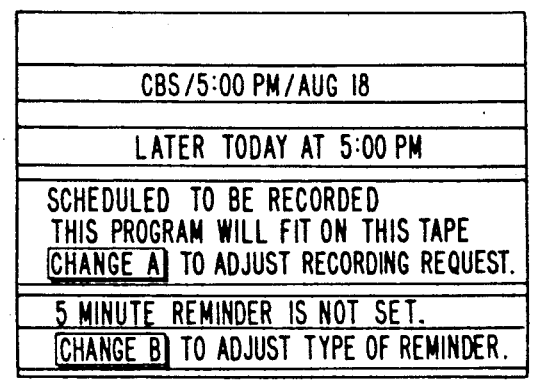

If it is desired to set up for recording in the future, the Record Later button 52.7 is depressed and the program description page as shown in FIG. 12a appears. Once the various parameters are set using the Change A and Change B buttons, 52.2 and 52.3, the request is saved by pressing the View button 52.4. The resulting program description page (FIG. 12b) is saved and the program name is now included on the Future Program extended channel.

It should be noted that during idle times, i.e. 5 minutes after the user ends a playback or immediately after the end of a recording session, the microcomputer 30, through the controller 50, causes the vcr deck 120 to position the tape to the beginning of the largest free block on the tape to accommodate the Record Now function. In addition, 10 minutes before the start of a scheduled recording, the microcomputer 30, through the controller 50, causes the vcr deck 120 to position the tape at the beginning of a free block which best matches, in time, the length of the program to be recorded.

Figure 13A:
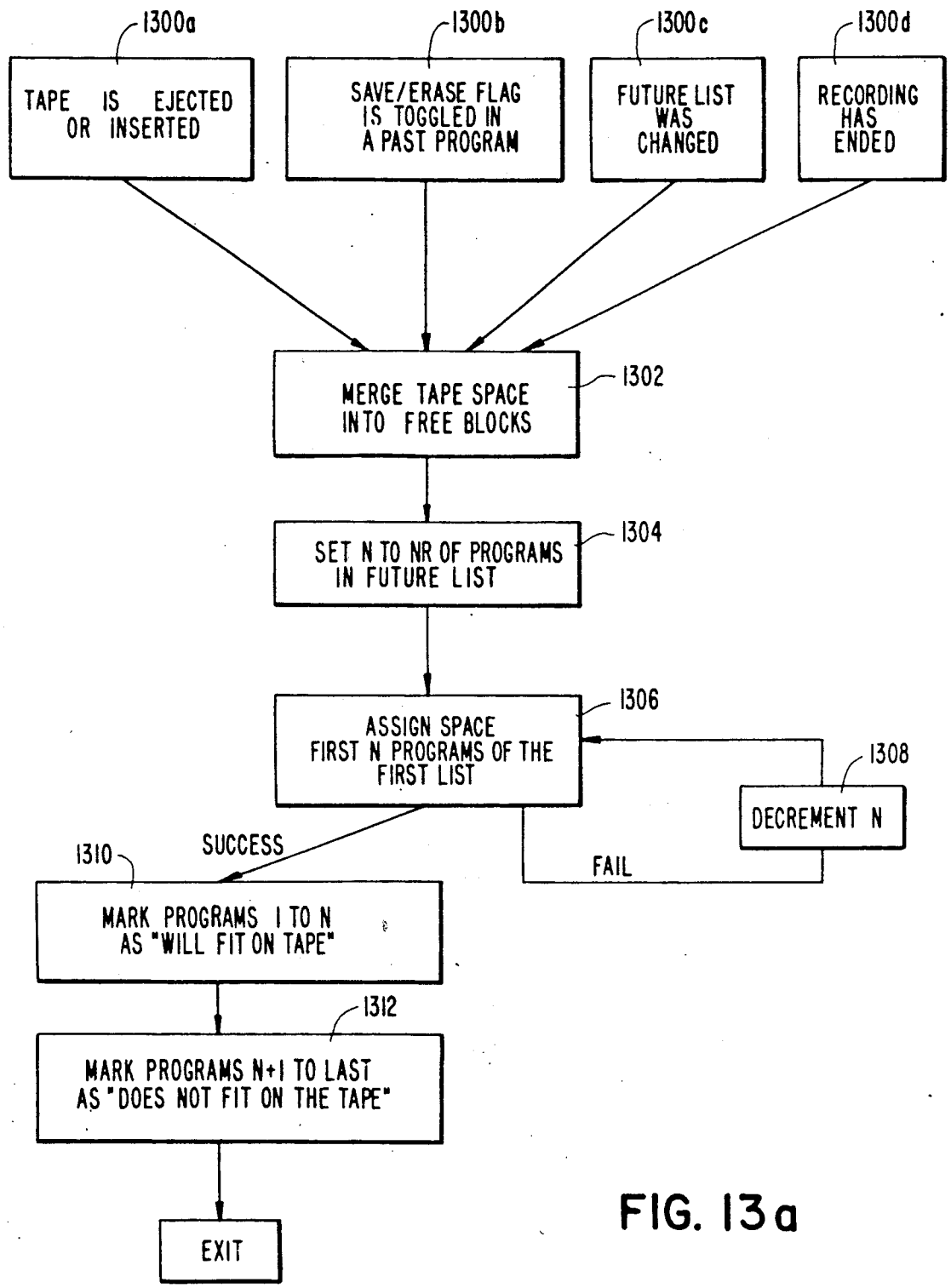

FIG. 13a shows a flow chart for effecting this process. In particular, any of the blocks 1300-1300a indicating the insertion of a tape into the vcr deck 120, 1300b indicating the toggling of the save/erase option for a previously recorded program, 1300c indicating the changing of the Future Program listing, and 1300d indicating after a recording session has ended—may initiate the routine. At block 1302, the microcomputer 30 merges adjacent tape spaces into free blocks. Then, at block 1304, the microcomputer 30 set the variable N to the number of programs in the Future Program listing (in this example, 7). At block 1306, the microcomputer 30 assigns spaces to the first N programs on the Future Program listing. If this is not possible, the microcomputer decrements N at block 1308 and then repeats block 1306. When the microcomputer 30 is able to successfully assign the space, the microcomputer 30 inserts the message "will fit on tape" into the appropriate program description pages corresponding to the first N programs in the Future Program listing and saves the particular space assignments (block 1310). At block 1312, the microcomputer then inserts the message "does not fit on the tape" into the appropriate program description pages corresponding to the remaining programs in the Future Program listing.

In order to enhance their visibility, these messages, along with other messages on the program description pages, may be displayed in colors contrasting to those used in other portions of the program description pages.

FIGS. 13b shows an illustration of a tape containing a succession of occupied blocks (taped programs to be saved), reusable blocks (taped programs to be erased), and blank blocks (blank tape), in which each of the blocks are in units of one-half hour. FIG. 13c shows the tape of FIG. 13b in which the adjacent available blocks are merged into free blocks.

Figure 13D:
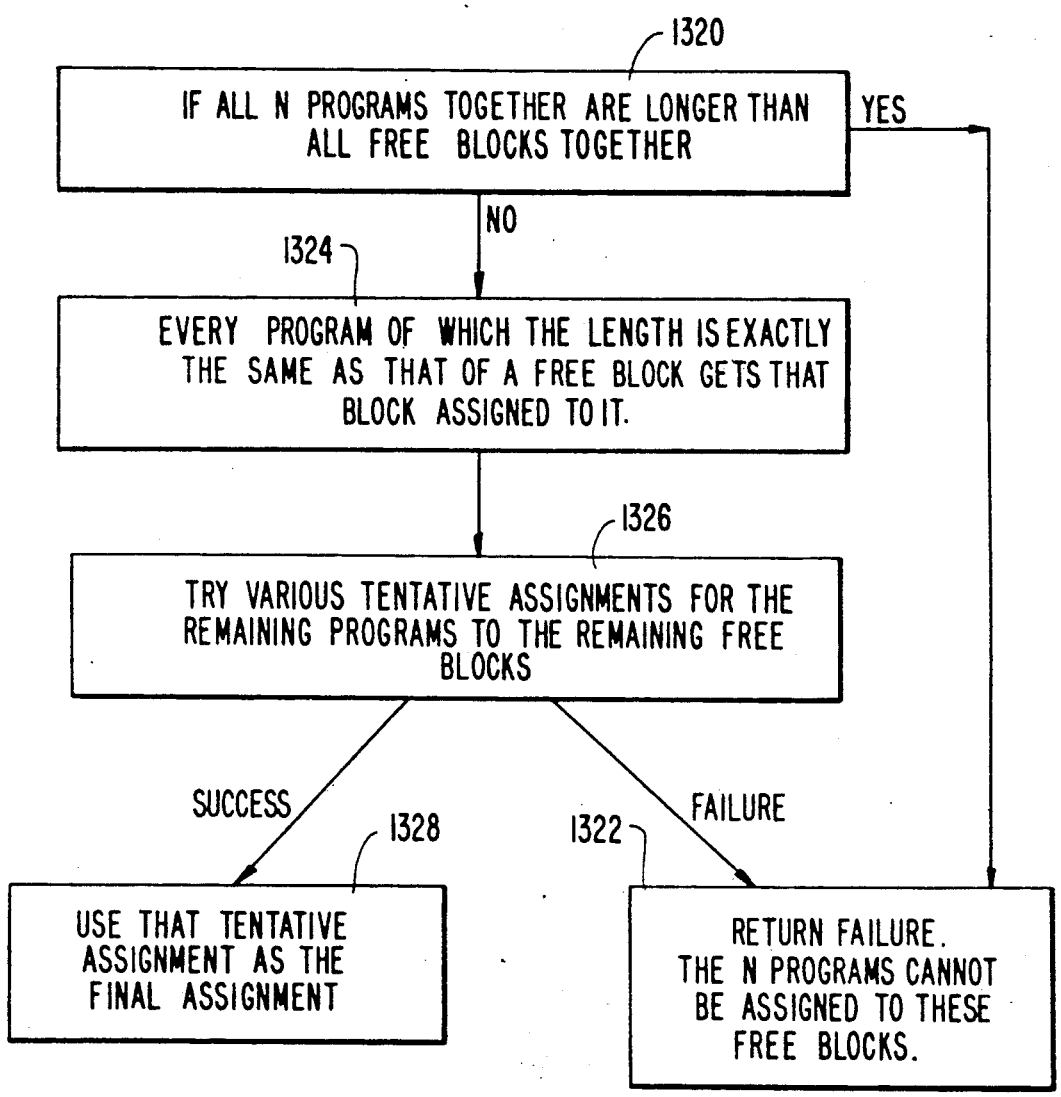

FIG. 13d shows a flow chart detailing the routine for block 1306. In particular, at block 1320, the microcomputer 30 checks whether the total recording time necessary for the N programs is greater than the total amount of time for all of the free blocks. If so, at block 1322, the microcomputer 30 sets a Failure flag. If not, the microcomputer 30 assigns free blocks to respective programs having the same length at block 1324. Then at block 1326, the microcomputer 30 attempts various assignments for the remaining free blocks to the remaining programs. In the event that the microcomputer 30 cannot complete the matching of block 1326, the microcomputer 30 branches to block 1322. Otherwise, at block 1328, the microcomputer 30 uses the tentative assignment as the final assignment.

FIG. 13e is a flow chart showing details of the block 1326 of FIG. 13d. In particular, at block 1330, the microcomputer 30 generates a first combination of programs and blocks. At block 1332, the microcomputer 30 then checks whether the total length of all the programs assigned to a block is less than or equal to the length of that block. If so, the microcomputer 30 branches to block 1328 indicating that a successful combination has been found. If not, at block 1334, the microcomputer 30 generates a new combination and then repeats the block 1332. When all combinations have been tried without success, the microcomputer 30 then branches to block 1322. FIG. 13f shows a chart illustrating the possible combinations for a particular program listing and a particular tape. Therein, programs 1 and 4 are directly matched with blocks 4 and 1. The remaining programs 2, 3 and 5, are then matched with the blocks 2, 2 and 3, respectively, as shown.

Figure 14A:
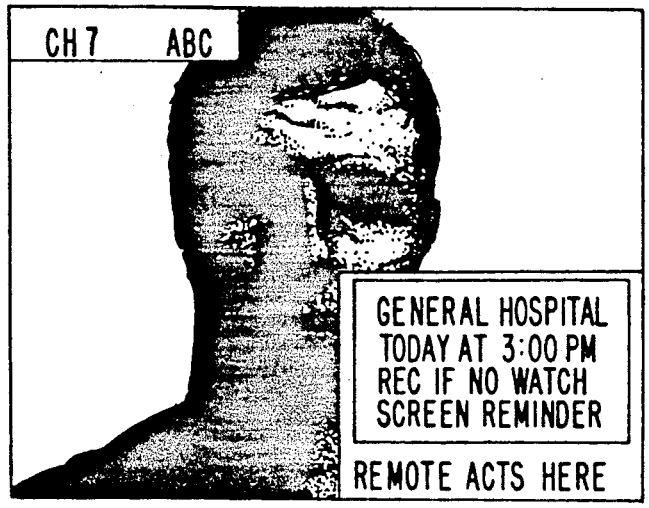
FIGS. 14a and 14b show various ones of the extended channels as depicted on a PIP display.
Figure 14B:
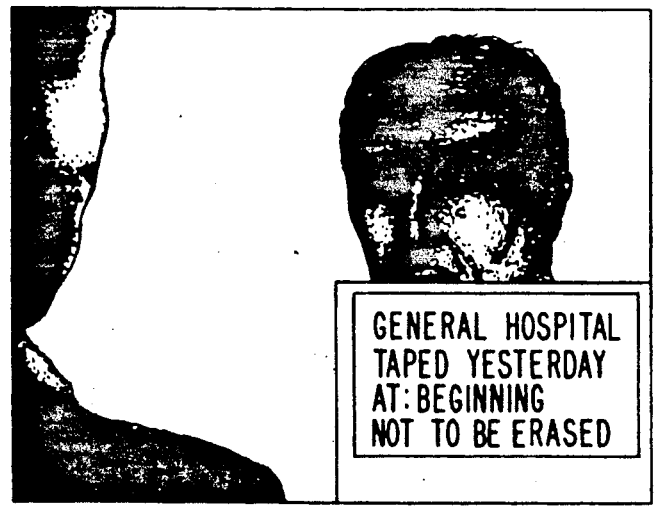

While up to this time, the various extended channels have been described as they would appear on the main display on the television monitor 100, it should be apparent that the extended channels may alternatively be selected as a PIP display overlying a portion of the main display. Since the PIP display is considerably smaller than the main display, the visual information in the extended channels would be essentially illegible if displayed in its entirety. FIGS. 14a and 14b show PIP representations of the program description pages for a Future Program and a Program on This Tape in which the textual material is shortened for visibility on the PIP display. When it is desired to display the extended channels on the PIP display, the controller 50 directs the PIP generator 110 to apply the appropriate video signal as the PIP display while the microcomputer 30 applies the PIP extended channels to the proper genlock circuit 40 or 42.

It should also be noted that the PIP display may be used to display various reminder messages. For example, at the start of a Future Program if another program is being watched, the PIP may display the initial 10 seconds of the Future Program allowing the user to selectively switch to that program if desired by swapping the PIP and the main display. Alternately, the PIP may be used to announce the commencement of recording of a Future Program.

FIG. 15 shows a block diagram of an alternate embodiment of the system. This embodiment is substantially similar to that shown in FIG. 2 with the exception that a single genlock circuit 40 is used which is positioned after the PIP circuit 110. In this arrangement, as opposed to the microcomputer 30 generating the PIP extended channel as a full-size video picture and the PIP circuit 110 then reducing this picture and positioning it on the television monitor 100, the microcomputer 30 instead directly generates the graphics for the PIP extended channel (and any PIP messages) and adds them to the video signal at the output of the PIP circuit 110 in such a way that they appear in the proper location on the television monitor 100.

Numerous alterations of the structure herein disclosed will suggest themselves to those skilled in the art. However, it is to be understood that the described embodiment is for purposes of illustration only and not to be construed as a limitation of the invention. All such modifications which do not depart from the spirit of the invention are intended to be included within the scope of the appended claims.

What is claimed is:

1. A system for integrating the operation and control of a television receiver and a video cassette recorder, said television receiver being capable of receiving and displaying various television broadcast channels as well as other video signals, and said video cassette recorder being capable of recording programs at least from said broadcast channels and reproducing programs previously recorded on tapes and outputting said programs as video signals, an output of said video cassette recorder being coupled to said television receiver, said system comprising:

means for enabling a user to control said system and thereby operate said television receiver and/or said video cassette recorder, and to enter information concerning said user's favorite broadcast programs and various particular broadcast programs into said system, said information including the program name, broadcast channel, starting time, length, repeat pattern in the case of favorite broadcast programs, and whether the user wants the program recorded;

first storing means for storing said favorite broadcast program information and said various particular broadcast program information, said information being stored in the form of program description pages and a menu page;

second storing means for storing information concerning programs on a tape currently loaded in said video cassette recorder, said information being stored in the form of program description pages and a menu page;

third storing means for storing information concerning programs on other tapes of said user, said information being stored in the form of menu pages;

means coupled to said video cassette recorder for operating the recording and reproducing functions thereof in response to said information stored in said first and second storing means and said enabling means;

output means coupled to said first, second and third storing means for applying to said television receiver an output of said system including said favorite broadcast program information, the program information of said current tape, and the program information of said other tapes, said output means outputting said program description pages and said menu pages as additional channels included in a television channel ring; and means coupled to said television receiver for switching said television receiver to selectively receive said broadcast channels, said video cassette recorder output and said system output.

2. A system as claimed in claim 1, wherein said television receiver and said video cassette recorder both have remote control receivers incorporated therein, and said video cassette recorder operating means comprises a first transmitter cooperating with said video cassette recorder remote control receiver, and said television receiver switching means comprises a second transmitter cooperating with said television receiver remote control receiver.

3. A system as claimed in claim 1, wherein said television receiver and said video cassette recorder comprise a television monitor, a video cassette recording/playback deck, and a first and a second television tuner.

4. A system as claimed in claim 3, wherein said system comprises a microcomputer having a memory coupled thereto for storing said various information, said microcomputer having an output for providing said system output; and a controller for generating control signals for said television monitor, said video cassette recording/playback deck and said first and second television tuners, said controller having data entry means and providing control signals for and receiving control signals from said microcomputer.

5. A system as claimed in claim 4, wherein said data entry means comprises a bar code scanner.

6. A system a claimed in claim 4, wherein said data entry means comprises a keyboard.

7. A system as claimed in claim 4, wherein said system further comprises video switching means connected to an output of said first and second tuners and said video cassette recording/playback deck; and a genlock circuit for selectively superposing the output of said microcomputer on an output of said video switching means, said genlock circuit having a first input connected to an output of said video switching means a second input connected to said output of said microcomputer, and an output coupled to said television monitor, said video switching means receiving switching control signals from said controller.

8. A system as claimed in claim 7, wherein said system further comprises a picture-in-picture generating circuit having a first input connected to the output of said genlock circuit and an output connected to said television monitor; a further video switching means also coupled to respective outputs of said first and second tuners and said video cassette recording/playback deck; and a further genlock circuit having a first input connected to an output of said further video switching means, a second input connected to a further output of said microcomputer, and an output, wherein said picture-in-picture generating circuit has a second input connected to the output of said further genlock circuit, whereby the output of either said genlock circuit or said further genlock circuit may be displayed on said television monitor as a main picture or a PIP picture overlying a portion of the main picture in response to control signals from said controller.

9. A system as claimed in claim 8, wherein said system further comprises a user operable remote control transmitter for controlling said controller, said remote control transmitter having switches for selecting channels in said first and second tuners, for operating said television monitor and said video cassette recording/playback deck, and for causing the display of various ones of said menu pages.

10. A system as claimed in claim 9, wherein said memory includes said first, second and third storing means, and wherein said information stored in each of said first and second storing means is in the form of program description pages and a menu page, and the information stored in said third storing means is in the form of menu pages.

11. A system as claimed in claim 10, wherein said microcomputer outputs said program description pages and said menu pages as additional channels included in the television channel ring.

12. A system as claimed in claim 11, wherein said program description pages and said menu pages include prompts relating to various ones of said switches on said remote control transmitter for selectively changing control information on said program description pages and for operating said system accordingly.

13. A system as claimed in claim 11, wherein said picture-in-picture generating circuit includes means for "freezing" a PIP representation of a scene from a particular program being broadcast and said system includes means for encoding and storing said frozen PIP representation, wherein each of said program description pages includes a picture of a scene from the program being described, said picture having been encoded and stored with said program information.

* * * * *